WILLIAM CALLOW, Jr.
Improvement in Car-Couplings.

No. 115,433.            Patented May 30, 1871.

Witnesses:          Inventor:
Leny. E. Baldwin      William Callow Jr.
William H. Howard

UNITED STATES PATENT OFFICE.

WILLIAM CALLOW, JR., OF BALTIMORE, MARYLAND.

IMPROVEMENT IN CAR-COUPLINGS.

Specification forming part of Letters Patent No. 115,433, dated May 30, 1871.

*To all whom it may concern:*

Be it known that I, WILLIAM CALLOW, Jr., of Baltimore, in the county of Baltimore and State of Maryland, have invented a new and Improved Coupling and Bumper for Railroad Cars, the nature and use of which, in the following specification, will be clearly and distinctly shown.

The nature of my invention, consists, first, in constructing the bumpers with solid faces, with no openings therein; and, second, in the combination with the bumpers thus constructed, the two chain-connections, arranged substantially as hereinafter set forth.

Having thus set forth the nature of my invention, and to enable others skilled in the art to make and use the same, I will now proceed to describe it, and certify that the accompanying drawing is a correct representation of the same, like letters corresponding with like parts.

Description.

Figure 1:
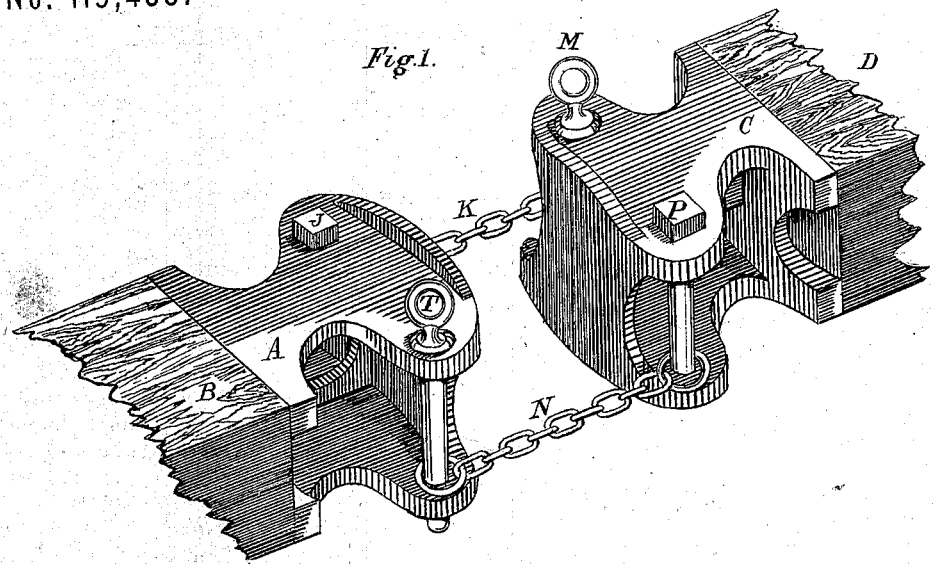
Figure 2:
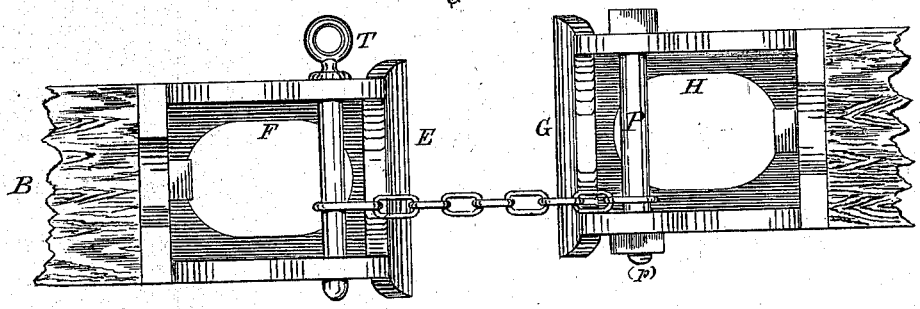
Figure 3:
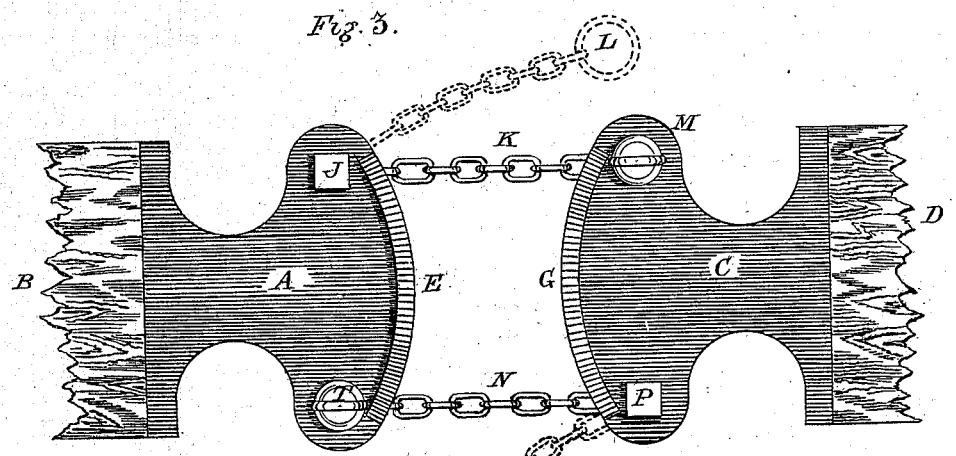

Figure 1 is a perspective view of the coupling and bumpers as applied to the cars. Fig. 2 is a side view of the same. Fig. 3 is a plan.

The dotted lines indicate the position of chains when disconnected.

A is a coupling and bumper secured to the beams of the car B in the usual way; C, a coupling and bumper secured to car D; E, the convex solid face of coupling and bumper A, strengthened by ribs or fillets F; G, face of corresponding coupling and bumper, C, strengthened by rib H. J is a bolt passing through the top plate of coupling and bumper A, and placed on the right side when facing it. Said bolt J passes through an eye or ring on chain K, then through bottom plate of coupling and bumper A, and is firmly secured by nut $k$ on the lower side. The other end of chain K has an eye or ring, L, to receive a pin, M, attached to the left side when facing coupling and bumper C. Said pin passes freely through the top plate, then through the eye or ring L, and through the bottom plate or coupling and bumper C. On the opposite or right-hand side, facing the coupling and bumper C, a chain, N, is secured by bolt P, which passes through the upper and lower plates of coupling and bumper C, and is secured by a nut, $p$, on the under side. The other end of chain N is provided with an eye or ring, S, to receive the pin T, which passes loosely through plate of coupling and bumper A, then through ring S, and through the lower plate of said coupling and bumper A, thereby connecting it with the coupling and bumper C on one side, while the chain K connects them on the other side, and forming a double connection.

The cars can be quickly disengaged by removing the pins M and T.

I do not claim, broadly, the bumpers, for they have been used before; but

I do claim—

1. The bumpers A C, constructed with enlarged solid convex faces, strengthened by means of ribs F F, and arranged to act in the double capacity of coupling and bumper, substantially as set forth.

2. In combination with the combined bumper and coupling, constructed as herein described, the chain-connections, all arranged to operate in the manner and for the purpose specified.

WILLIAM CALLOW, JR.

Witnesses:
LEROY E. BALDWIN,
WILLIAM H. HOWARD.